United States Patent

Bonner

[11] Patent Number: 5,859,129
[45] Date of Patent: Jan. 12, 1999

[54] POLYMER BLENDS

[75] Inventor: James Graham Bonner, Edinburgh, Scotland

[73] Assignee: BP Chemicals Limited, London, England

[21] Appl. No.: 740,552

[22] Filed: Oct. 30, 1996

Related U.S. Application Data

[63] Continuation of Ser. No. 393,228, Feb. 23, 1995, abandoned.

[30] Foreign Application Priority Data

Feb. 25, 1994 [GB] United Kingdom .................. 9403700

[51] Int. Cl.$^6$ ..................................... C08L 23/26
[52] U.S. Cl. .......................... 525/64; 525/185; 528/220; 528/392
[58] Field of Search ................... 525/64, 185; 528/220, 528/392

[56] References Cited

U.S. PATENT DOCUMENTS

| | | |
|---|---|---|
| H1404 | 1/1995 | George ................................. 525/185 |
| 3,694,412 | 9/1972 | Nozaki . |
| 4,709,808 | 12/1987 | Balduff et al. ........................... 206/158 |
| 4,818,810 | 4/1989 | Drent ....................................... 528/392 |
| 4,868,242 | 9/1989 | George et al. ............................ 525/64 |
| 5,089,556 | 2/1992 | Tabor et al. .............................. 525/64 |
| 5,147,712 | 9/1992 | Miyahara et al. ...................... 428/224 |

FOREIGN PATENT DOCUMENTS

| | | |
|---|---|---|
| 407762 | 6/1991 | European Pat. Off. . |
| 3-199415 | 8/1991 | Japan . |
| WO91/09729 | 7/1991 | WIPO . |
| 2091/18944 | 12/1991 | WIPO . |

OTHER PUBLICATIONS

Encyclopedia of Polymer Science & Engineering, 2nd ed., No. 6, pp. 454–490, Dec. 1986.

*Primary Examiner*—Fred Zitomer
*Attorney, Agent, or Firm*—Fay, Sharpe, Beall, Fagan, Minnich & McKee

[57] ABSTRACT

A polymer blend comprises a polyketone and a high density polyethylene (HDPE) optionally grafted with at least one polymerisable ethylenically unsaturated carboxylic acid or derivative thereof. Such blends have good barrier properties and are suitable for packaging applications.

13 Claims, No Drawings

POLYMER BLENDS

This is a continuation of U.S. application Ser. No. 08/393,228, filed Feb. 23, 1995, now abandoned.

This invention relates to polymer blends comprising polyketones and polyethylene, in particular high density polyethylene (HDPE).

For the purpose of this patent, polyketones are defined as linear polymers having an alternating structure of (a) units derived from carbon monoxide and (b) units derived from one or more olefinically unsaturated compounds. Although for the purposes of this patent polyketones correspond to this idealised structure, it is envisaged that materials corresponding to this structure in the main but containing small regimes (i.e. up to 10 wt %) of the corresponding homopolymer or copolymer derived from the olefinically unsaturated compound, also fall within the definition.

Such polyketones have the formula:

$$[(CR_2-CR_2)C]_m \quad \text{(I)}$$

where the R groups are independently hydrogen or hydrocarbyl groups, and m is a large integer; they are disclosed in several patents e.g. U.S. Pat. No. 3,694,412. Processes for preparing the polyketones are disclosed in U.S. Pat. No. 3,694,412 and also in EP 181014 and EP 121965.

Polyketones can be used in a variety of applications including, for example, packaging. It is important in the case of polymers used in some packaging applications to improve the barrier properties of the polymer. EP 90554 to Du Pont discloses blends of polyolefins and condensation polymers with improved barrier properties. However, there is no indication in EP 90554 that the barrier properties of polyketones can be improved by blending with other polymers.

We have now found that the barrier properties (eg oxygen, water and hydrocarbon) of polyketones and HDPE can be significantly improved by blending polyketone with HDPE. In particular, the water vapour transmission rate in polyketones (WVTR) can be significantly reduced. Polymer blends of polyethylene and polyketone are known. In particular EP 392759 discloses the use of polyketones for enhancing the photodegradability of thermoplastic polymers including polyethylene. However, in this case the specific type of polyethylene used in the polymer blends was low density polyethylene having a density of about 0.92g/cm$^3$. In addition there was no indication in EP 392759 that such blends would have enhanced barrier properties.

Thus according to the present invention there is provided a polymer blend comprising a polyketone and a high density polyethylene, optionally grafted with at least one polymerisable ethylenically unsaturated carboxylic acid or derivative thereof.

High density polyethylene (HDPE) is a term well known in the art. HDPE polymers are normally solid, high molecular weight, highly crystalline, homopolymers of ethylene or a copolymer of ethylene with a small amount of an alpha-olefin comonomer (e.g. a $C_3$ to $C_8$ alpha olefin) for property modification. The density range of HDPE is typically from 0.940 to 0.970g/cm$^3$ preferably 0.945 to 0.960g/cm$^3$. The melt index (2.16kg load at 190° C.) of the HDPE will suitably be in the range 0.1 to 26, preferably 1.0 to 10 for example 2 to 7.

Alternatively the HDPE may be a maleic anhydride grafted HDPE, or related product, in particular a polymer having an HDPE backbone grafted with 0.001 to 30% by weight of at least one polymerisable ethylenically unsaturated carboxylic acid or derivative thereof. Blends of two or more HDPE's can be used in the grafting process.

Polymerisable ethylenically unsaturated carboxylic acids and derivatives thereof include, for example, acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo (2.2.2) oct-5-ene-2,3-dicarboxylic acid anhydride, 1,2,3,4,5,8,9,10-octahydronaphthalene-2,4 dicarboxylic acid anhydride, 2-oxa-1,3-diketospiro (4.4) non-7-ene, bicyclo (2.2.1) hept-5-ene-2,3-dicarboxylic acid anhydride, maleopimaric acid, tetrahydrophthalic anhydride, x-methyl-bicyclo (2.2.1) hept-5-ene -2,3-dicarboxylic acid anhydride, x-methyl-norborn-5-ene-2,3 dicarboxylic acid anhydride, norborn-5-ene,2,3-dicarboxylic acid anhydride. Preferably, acrylic acid or maleic anhydride is used. When maleic anhydride is used as the polymerisable ethylenically unsaturated carboxylic acid anhydride, the amount which is grafted onto the HDPE backbone is typically from 0.001 to 30% by weight.

Co-grafting monomers such as, for example, those described in U.S. Pat. No. 3,882,194 may also be used for preparing the graft copolymers of the present invention.

Methods for preparing graft copolymers are well known and any suitable method can be used to prepare the graft copolymer of the HDPE and polymerisable ethylenically unsaturated carboxylic acid or derivative thereof. One such suitable method comprises blending together the HDPE and the polymerisable ethylenically unsaturated carboxylic acid or derivative thereof in the presence of a free radical initiator, such as an organic peroxide or hydroperoxide, at a temperature which is above the melting point of the polyolefin and which provides a suitable half-life of the free radical initiator. Suitable free radical initiators are well known. This grafting process can be carried out using known mixing equipment such as, for example, a Brabender mixer, a Banbury mixer or a roll mill. Preferably, the grafting process is carried out in a closed vessel. A convenient method of preparing the graft copolymer is therefore to extrude the HDPE which forms the polymer backbone, the polymerisable ethylenically unsaturated carboxylic acid or derivative thereof and an organic peroxide or hydroperoxide through a single or multiple screw extruder.

As noted above for the purposes of this patent, polyketones are defined as linear polymers having an alternating structure of (a) units derived from carbon monoxide and (b) units derived from one or more olefinically unsaturated compounds. Suitable olefinic units are those derived from $c_2$ to $c_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of ethylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30. Typically, the polyketone will be a copolymer of ethylene/propylene/CO where the propylene is in the range 5–8% e.g. 6% by weight of the polymer. The Melt Flow Rate (5 kg load at 240° C.) is typically in the range 5–200 preferably 10–150, more preferably 20–100 g for example 40–80 g/10 mins.

The polyketone will suitably have a number average molecular weight of between 40,000 to 100,000 preferably between 50,000 and 250,000 for example 60,000 to 150,000. A preferred polyketone is an ethylene/propylene/Co terpolymer having a number average molecular weight in the range 60,000 to 150,000.

The blends of polyketone and HDPE can be prepared using known techniques and equipment for batch or continuous blending. The blends according to the present invention may also contain additives conventionally used in such compositions such as, for example, antioxidants.

The weight ratio of polyketone to HDPE is suitably in the range 1:10 to 10:1 preferably 1:3 to 3:1 more preferably 1:1.5 to 1.5:1 for example 1:1. However, where the water barrier properties (as measured by the water vapour transmission rate) of polyketones are to be improved, it is preferred that 1–50%, preferably 5–40% for example 30% by weight of HDPE is added to polyketone (ie a polyketone to HDPE ratio of 7:3). On the other hand, if the oxygen barrier and/or hydrocarbon barrier properties of HDPE are to be improved, it is preferred that 1–50% preferably 10–40% for example 30% by weight of polyketone is added to HDPE (ie a polyketone:HDPE ratio of 3:7).

Other polymers may be blended with the blend composition of the present invention; the nature and amount of such a polymer will depend upon what modifications of the polymer properties are required. Furthermore the blends of the present invention may contain conventional polymer additives such as anti-oxidants, stabilisers, and mould release agents.

The blends of the present invention are particularly suitable for packaging applications, for example containers (e.g. bottles for use with food and beverages and hydrocarbon solvent) and film.

According to a further aspect of the present invention there is provided a polymer-based container suitable for use with food or beverages wherein the polymer comprises a blend of a polyketone and HDPE optionally grafted with at least one polymerisable ethylenically unsaturated carboxylic acid or derivative thereof.

Such a container may be made at least in part from a monolayer of the blend. Alternatively it could be of a multi-layer construction at least one layer of which is a blend according to the present invention. However, a mono-layer construction is preferred.

Methods of fabricating the blends into either containers, films or other applications are standard in the art, for example extrusion, coextrusion, injection moulding, blow-moulding. Preferred methods of fabricating the blends are those where orientation of the polymer is likely e.g. extrusion (film extrusion) and blow-moulding.

The invention will now be illustrated by the following Examples.

EXAMPLE 1

Blends of polyketone (an ethylene/propylene/CO terpolymer) (EPCO) having a melting point of 201° C. and a MFR of 66 g/10 mins (5 kg load at 240° C.) with HDPE (HD5050 commercially available from BP Chemicals with a density of 0.950 g/cm$^3$ and an MFR of 5 g/10 mins (2.16 kg load at 190° C.)) and maleic anhydride grafted HDPE (Polybond 3009 commercially available from BP Chemicals which contains ~1% by weight of grafted maleic anhydride groups; the MFR is 34 g/10 mins 5 kg load at 240° C.) were prepared, using a ZSK 30 co-rotating twin screw extruder.

The Water Vapour Transmission Rates (WVTR) of ~50 μm film samples of EPCO+HD5050 and EPCO+PB3009 blends produced on a Plasticisers film extruder were measured using a Permatran W1A at 38° C. and 100% relative humidity. Test specimens were masked giving an actual test area of 5cm$^2$. The simple tensile properties of the films were also measured together with the oxygen transmission rates (OTR) at 23° C. and 75% relative humidity.

The results are given in Table I.

Furthermore a thin film (~50 μm thick) of the polyketone/HDPE blend was more readily produced than a film of the polyketone alone. Without the presence of HDPE constant thickness, continuous films could not be produced at the same rates.

EXAMPLE 2

Blends containing HD5050 and EPCO were prepared as in Example 1 except that an APV 15 mm co-rotating twin screw extruder was used. Additionally blends containing 50, 70 and 90% by weight of HDPE were prepared. The tensile properties and melt flow rates of these materials are given in Table II.

TABLE I

| Sample | Spec No. | Meam Thickness (μm) | Mean WVTR g/m$^2$/day/atm | Water Permeation Coefficient g · mm/m$^2$/day | Mean Water Perm. Coefficient g · mm/m$^2$/day | Mean Oxygen Permeability Coefficient cc · cm/cm$^2$/s/cmHg | Tangent Modulus (MPa) | Yield Strength (MPa) | Fracture Stress (MPa) | Elongation to Failure (%) |
|---|---|---|---|---|---|---|---|---|---|---|
| EPCO | 1 | 49 | 28.3 | 13.9 | 13.2 | 6.2 × 10$^{-12}$ | 833 | 39.4 | 52.4 | 371 |
| | 2 | 48 | 28.4 | 13.6 | | | | | | |
| | 3 | 41 | 29.4 | 12.0 | | | | | | |
| EPCO (90%) | 1 | 43 | 21.0 | 9.0 | 8.9 | 1.04 × 10$^{-11}$ | 845 | 36.1 | 58.3 | 418 |
| + | 2 | 44 | 22.6 | 9.9 | | | | | | |
| HD5050 (10%) | 3 | 36 | 21.5 | 7.8 | | | | | | |
| EPCO (70%) | 1 | 41 | 8.1 | 3.3 | 3.3 | 1.78 × 10$^{-11}$ | 669 | 26.0 | 44.6 | 405 |
| + | 2 | — | — | — | | | | | | |
| HD5050 (30%) | 3 | — | — | — | | | | | | |
| EPCO (90%) | 1 | 54 | 17.7 | 9.6 | 10.0 | — | — | — | — | — |
| + | 2 | 49 | 21.2 | 10.4 | | | | | | |
| PB3009 (10%) | 3 | 58 | 17.4 | 10.1 | | | | | | |
| EPCO (70%) | 1 | 42 | 7.4 | 3.1 | 3.3 | — | — | — | — | — |
| + | 2 | 48 | 6.8 | 3.3 | | | | | | |
| PB3909 (30%) | 3 | 45 | 7.9 | 3.6 | | | | | | |

TABLE II

EPCO/HDPE BLENDS

| % wt HDPE (HD5050) | MFR (g/10 mins) 240° C., 5 kg | Tangent Modulus (MPa) | Yield Strength (MPa) | Fracture Stress (MPa) | Elongation to Failure (%) |
|---|---|---|---|---|---|
| 0 | 59 | 833 | 39.4 | 52.4 | 371 |
| 30 | 60 | 544 | 23.5 | 36.2 | 415 |
| 50 | 49 | 504 | 20.5 | 29.5 | 444 |

TABLE II-continued

EPCO/HDPE BLENDS

| % wt HDPE (HD5050) | MFR (g/10 mins) 240° C., 5 kg | Tangent Modulus (MPa) | Yield Strength (MPa) | Fracture Stress (MPa) | Elongation to Failure (%) |
|---|---|---|---|---|---|
| 70 | 37 | 460 | 19.8 | 30.6 | 567 |
| 90 | 22 | 363 | 15.5 | 23.4 | 741 |
| 100 | 21 | 288 | 14.9 | 28.2 | 901 |

I claim:

1. A polymer blend comprising a linear polyketone having an alternating structure of (a) units prepared from carbon monoxide and (b) units prepared from one or more olefinically unsaturated compounds, and a high density polyethylene (HDPE) optionally grafted with at least one polymerisable ethylenically unsaturated carboxylic acid or compound selected from the group consisting of acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo (2.2.2) oct-5-ere-2,3-dicarboxylic acid anhydride, 1,2,3,4,5,8,9,10-octahydronaphthalene-2,4 dicarboxylic acid anhydride, 2-oxa-1,3-diketospiro (4,4) non-7-ene, bicyclo (2.2.1) hept-5-ene 2,3-dicarboxylic acid anhydride, maleopimaric acid, tetrahydrophthalic anhydride, x-methyl-bicyclo (2.2.1)-hept-5-ene-2,3-dicarboxylic acid anhydride, x-methyl-norborn-5-ene-2,3 dicarboxylic acid anhydride, norborn-5-ene,2,3,-dicarboxylic acid anhydride and mixtures thereof.

2. A polymer blend as claimed in claim 1 wherein the polyketone has a number average molecular weight in the range 40,000 to 1,000,000.

3. A polymer blend as claimed in claim 2 wherein the polyketone has a number average molecular weight in the range 60,000 to 150,000.

4. A polymer blend as claimed in claim 1 wherein the polyketone has a melt flow rate with 5 kg load at 240° C. in the range 5 to 150 g per 10 minutes.

5. A polymer blend as claimed in claim 4 wherein the polyketone has a melt flow rate with 5 kg load at 240° C. in the range 40 to 80 g per 10 minutes.

6. A polymer blend as claimed in claim 1 wherein the HDPE has a density in the range 0.940 to 0.970 g/cm$^3$.

7. A polymer blend as claimed in claim 6 wherein the HDPE has a density in the range 0.945 to 0.960 g/cm$^3$.

8. A polymer blend as claimed in claim 1 wherein the polyketone is prepared from ethylene and optionally one or more $C_3$ to $C_6$ normal alpha-olefins.

9. A polymer blend as claimed in claim 8 wherein the polyketone is an ethylene/propylene/CO terpolymer.

10. A polymer-based container suitable for use with food or beverages wherein the polymer comprises a linear blend of a polyketone having an alternating structure of (a) units prepared from carbon monoxide and (b) units prepared from one or more olenfinically unsaturated compounds, and HDPE optionally grafted with at least one polymerisable ethylenically unsaturated carboxylic acid or compound selected from the group consisting of acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo (2.2.2) oct-5-ene-2,3-dicarboxylic acid anhydride, 1,2,3,4,5,8,9,10-octahydronaphthalene-2,4 dicarboxylic acid anhydride, 2-oxa-1, 3-diketospiro (4.4) non-7-ene, bicyclo (2.2.1) hept-5-ene-2,3-dicarboxylic acid anhydride, maleopimaric acid, tetrahydrophthalic anhydride, x-methyl-bicyclo (2.2.1) hept-5-ene-2 ,3-dicarboxylic acid anhydride, x-methyl-norborn-5-ene-2,3 dicarboxylic acid anhydride, norborn-5-ene,2,3,-dicarboxylic acid anhydride and mixtures thereof.

11. A polymer-based container as claimed in claim 10 wherein the container is made at least in part from a monolayer of the blend.

12. A polymer blend comprised of (i) a linear polyketone having predominantly an alternating structure of units prepared from carbon monoxide and units prepared from one or more olefinically unsaturated compounds and (ii) a high density polyethylene (HDPE) optionally grafted with at least one polymerisable ethylenically unsaturated carboxylic acid or compound selected from the group consisting of acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo (2.2.2) oct-5-ene-2,3-dicarboxylic acid anhydride, 1,2,3,4,5,8,9,10-octahydronaphthalene-2,4 dicarboxylic acid anhydride, 2-oxa-1, 3-diketospiro (4.4) non-7-ene, bicyclo (2.2-1) hept-5-ene-2,3-dicarboxylic acid anhydride, maleopimaric acid, tetrahydrophthalic anhydride, x-methyl-bicyclo (2.2.1) hept-5-ene-2,3-dicarboxylic acid anhydride, x-methyl-norborn-5-ene-2,3 dicarboxylic acid anhydride, norborn-5-ene,2,3,-dicarboxylic acid anhydride and mixtures thereof and optionally (iii) an antioxidant.

13. A polymer blend comprising a linear polymer having the formula:

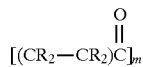

$$[(CR_2-CR_2)C]_m$$

where the R groups are independently hydrogen or hydrocarbyl groups and m is an integer such that the polymer has a number average molecular weight of up to 1,000,000, and a high density polyethylene (HDPE) optionally, grafted with at least one polymerisable ethylenically unsaturated carboxylic acid or compound selected from the group consisting of acrylic acid, methacrylic acid, maleic acids itaconic acid, citraconic acid, mesaconic acid, maleic anhydride, 4-methyl cyclohex-4-ene-1,2-dicarboxylic acid anhydride, bicyclo (2.2.2) oct-5-ene-2,3-dicarboxylic acid anhydride, 1,2,3,4,5,8,9,10-octahydronaphthalene-2,4 dicarboxylic acid anhydride, 2-oxa-1, 3-diketospiro (4.4) non-7-ene, bicyclo (2.2.1) hept-5-ene-2,3-dicarboxylic acid anhydride, maleopimaric acid, tetrahydrophthalic anhydride, x-methyl-bicyclo (2.2.1) hept-5-ene-2,3-dicarboxylic acid anhydride, x-methyl-norborn-5-ene-2,3 dicarboxylic acid anhydride, norborn-5-ene,2,3,-dicarboxylic acid anhydride and mixtures thereof.

* * * * *